United States Patent
Lavelle et al.

(10) Patent No.: US 6,661,423 B2
(45) Date of Patent: Dec. 9, 2003

(54) SPLITTING GROUPED WRITES TO DIFFERENT MEMORY BLOCKS

(75) Inventors: Michael G. Lavelle, Saratoga, CA (US); Ewa M. Kubalska, San Jose, CA (US); Elena M. Ing, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 239 days.

(21) Appl. No.: 09/861,184

(22) Filed: May 18, 2001

(65) Prior Publication Data

US 2002/0171653 A1 Nov. 21, 2002

(51) Int. Cl.[7] .............................................. G06F 12/06
(52) U.S. Cl. ...................... 345/572; 345/531; 711/201
(58) Field of Search ................................. 345/531, 572, 345/568, 619, 501, 564, 573, 569, 566, 530, 571; 711/200, 202, 201, 206, 203

(56) References Cited

U.S. PATENT DOCUMENTS

| | | | | | |
|---|---|---|---|---|---|
| 5,736,988 A | * | 4/1998 | Shaw et al. | ................. | 345/423 |
| 5,815,168 A | * | 9/1998 | May | ............................ | 345/572 |
| 5,949,429 A | * | 9/1999 | Bonneau et al. | ............ | 345/619 |
| 5,999,199 A | * | 12/1999 | Larson | ........................ | 345/531 |
| 6,064,407 A | * | 5/2000 | Rogers | ........................ | 345/568 |
| 6,195,737 B1 | * | 2/2001 | Hollister et al. | ............ | 711/220 |
| 6,545,684 B1 | * | 4/2003 | Dragony et al. | ............ | 345/531 |

OTHER PUBLICATIONS

"Memory management support for titled array organization" by Gary Newman, Computer Architecture News, vol. 20, No. 4, 9/92 pp. 2–30.*

* cited by examiner

Primary Examiner—Kee M. Tung
(74) Attorney, Agent, or Firm—Meyertons Hood Kivlin Kowert & Goetzel, P.C.

(57) ABSTRACT

A memory array management unit suitable for use in a computer graphics system is described. The unit is especially designed to facilitate the storage of tiles of graphics data. Alignment detection between the tiles and memory block boundaries is provided for, with misalignments resulting in the automatic decimation to produce sub-tiles and generation of multiple memory write sequences.

37 Claims, 13 Drawing Sheets

SPLITTING GROUPED WRITES TO DIFFERENT MEMORY BLOCKS

BACKGROUND OF THE INVENTION

1. Field of the Invention

This invention relates generally to the field of computer graphics and, more particularly, to graphics frame buffer architecture.

2. Description of the Related Art

With each new generation of graphics system, there is more image data to process and less time in which to process it. This consistent increase in data rates places additional burden on the memory systems that form an integral part of the graphics system. Attempts to further improve graphics system performance are now running up against the limitations of these memory systems in general, and memory device limitations in particular.

In order to provide memory systems with increased data handling rates, system architects may employ a form of memory architecture known as tessellated memory. In a tessellated memory design, a single read or write operation to the memory array results in the retrieval or storage of a group of data elements or tiles. In general, such a tessellated memory is optimized for the storage and retrieval of tiles having fixed dimensions and boundaries which are stationary (i.e. with respect to word boundaries within the memory array). The design of such a memory is well known in the art. For example, the 3D-RAM memory from Mitsubishi corporation may be used to implement one such tessellated memory.

Unfortunately, problems often arise in the implementation of tessellated memories when the tiles to be stored or retrieved are not stationary within the address space of the memory. For example, in a generalized graphics system, graphical elements may be drawn using supersamples, (i.e., picture elements which are submultiples of the display pixels). To increase system throughput, these supersamples may grouped into tiles for storage in a frame buffer. If the supersamples have no immediate correlation to a fixed reference, such as displayable pixels, it is possible that the boundaries of the supersample tiles may be misaligned with the tiles of the tessellated memory. If a misalignment occurs, then the storage of the tile fails, (i.e., the elements of the tile are not stored coherently within the memory array). For these reasons, a system and method for storing misaligned data to graphics system memory is desired.

SUMMARY OF THE INVENTION

The problems set forth above may at least in part be solved in some embodiments by a system or method for detecting memory block boundary violations and splitting tiled graphics data accordingly. In one embodiment, the system may include a memory configured to receive and store tiles of graphics data. The memory may be further configured as an array of storage devices, allowing for an entire tile of graphics data to be written in a single operation. In some embodiments, this array may include 3D-RAM devices. A boundary violation detector may be connected to the memory, and may be configured to examine the target address of a single unit of graphics data within the tile in order to determine whether the entire tile falls within the block boundaries of the memory. A write controller may also be connected to the memory and to the boundary violation detector, and may be configured to employ the boundary violation information to generate a sequence of storage operations to the memory according to the number of boundaries violated.

As noted above, a method for detecting memory block boundary violations is also contemplated. In one embodiment, the method includes dividing the target address into fields which describe the dimensions of a memory block, and the number of horizontal and vertical memory blocks contained in the memory. Next, a value which correlates to the size of the tile may then be added to the fields describing the memory block dimensions. A modulo operation may then be performed on the results of the addition where the memory block dimensions are used for the modulus. If the result of a modulo operation is zero, then the associated boundary violation is indicated. The boundary violations may then be used to split the tile accordingly. A horizontal boundary violation may cause the tile to be split into two sub-tiles along a vertical axis, whereas vertical boundary violation may cause the tile to be split into two sub-tiles along a horizontal axis. If both boundaries are violated, then the tile may be split along both the horizontal and vertical axis, resulting in four sub-tiles.

In one embodiment, the system may be integrated into a graphics system suitable for creating and displaying graphic images. In other embodiments, the system may be part of an optional assembly, communicating with a host graphics system through the use of a data or control bus specific to the host.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
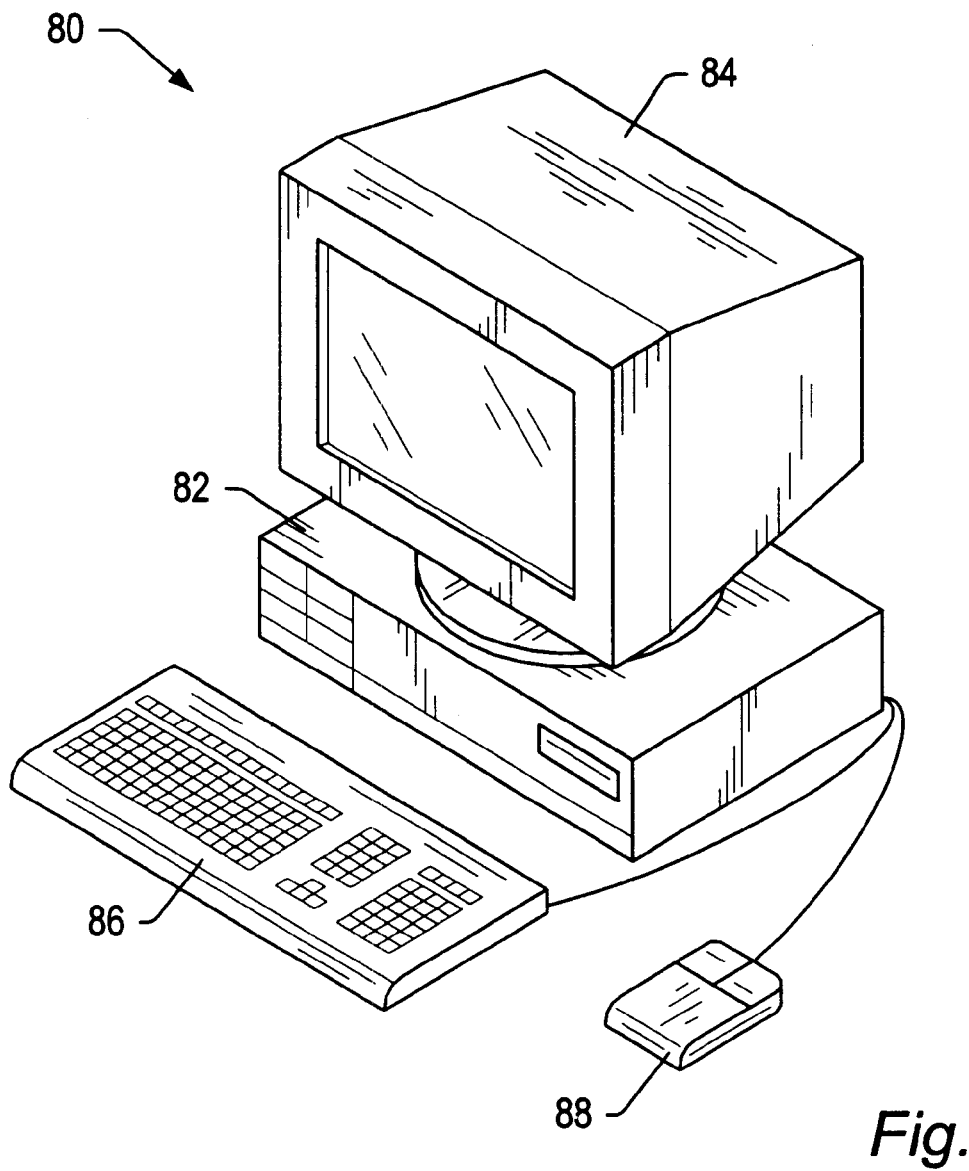
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Please note that the section headings used herein are for organizational purposes only and are not meant to limit the description or claims. The word "may" is used in this application in a permissive sense (i.e., having the potential to, being able to), not a mandatory sense (i.e., must). Similarly, the word include, and derivations thereof, are used herein to mean "including, but not limited to."

DETAILED DESCRIPTION OF THE PREFERRED EMBODIMENTS

Computer System—FIG. 1

Referring now to FIG. 1, one embodiment of a computer system 80 that includes a graphics system that may be used to implement one embodiment of the invention is shown. The graphics system may be comprised in any of various systems, including a computer system, network PC, Internet appliance, a television, including HDTV systems and interactive television systems, personal digital assistants (PDAs), virtual reality systems, and other devices which display 2D and or 3D graphics, among others.

As shown, the computer system 80 comprises a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
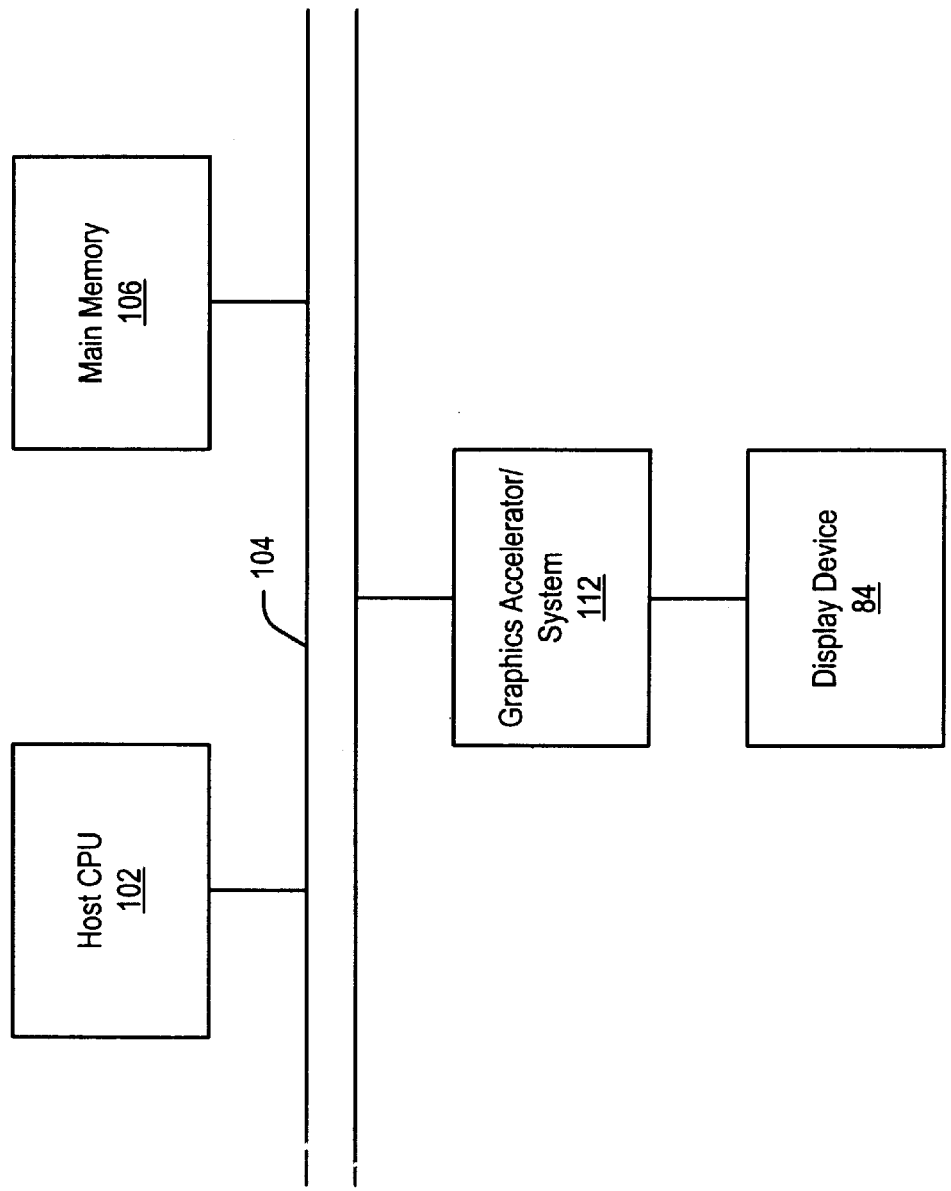
FIG. 2 is a simplified block diagram of one embodiment of a computer system.

Computer System Block Diagram—FIG. 2

Referring now to FIG. 2, a simplified block diagram illustrating the computer system of FIG. 1 is shown. Elements of the computer system that are not necessary for an understanding of the present invention are not shown for convenience. As shown, the computer system 80 includes a central processing unit (CPU) 102 coupled to a high-speed memory bus or system bus 104 also referred to as the host bus 104. A system memory 106 may also be coupled to high-speed bus 104.

Host processor 102 may comprise one or more processors of varying types, e.g., microprocessors, multi-processors and CPUs. The system memory 106 may comprise any combination of different types of memory subsystems, including random access memories, (e.g., static random access memories or "SRAMs," synchronous dynamic random access memories or "SDRAMs," and Rambus dynamic random access memories or "RDRAM," among others) and mass storage devices. The system bus or host bus 104 may comprise one or more communication or host computer buses (for communication between host processors, CPUs, and memory subsystems) as well as specialized subsystem buses.

In FIG. 2, a graphics system 112 is coupled to the high-speed memory bus 104. The 3-D graphics system 112 may be coupled to the bus 104 by, for example, a crossbar switch or other bus connectivity logic. It is assumed that various other peripheral devices, or other buses, may be connected to the high-speed memory bus 104. It is noted that the graphics system may be coupled to one or more of the buses in computer system 80 and/or may be coupled to various types of buses. In addition, the graphics system may be coupled to a communication port and thereby directly receive graphics data from an external source, e.g., the Internet or a network. As shown in the figure, one or more display devices 84 may be connected to the graphics system 112 comprised in the computer system 80.

Host CPU 102 may transfer information to and from the graphics system 112 according to a programmed input/output (I/O) protocol over host bus 104. Alternately, graphics system 112 may access the memory subsystem 106 according to a direct memory access (DMA) protocol or through intelligent bus mastering.

A graphics application program conforming to an application programming interface (API) such as OpenGL or Java 3D may execute on host CPU 102 and generate commands and data that define a geometric primitive (graphics data) such as a polygon for output on display device 84. As defined by the particular graphics interface used, these primitives may have separate color properties for the front and back surfaces. Host processor 102 may transfer this graphics data to memory subsystem 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain elements of the illustrated graphics system 112 may be implemented in software.

Figure 3:
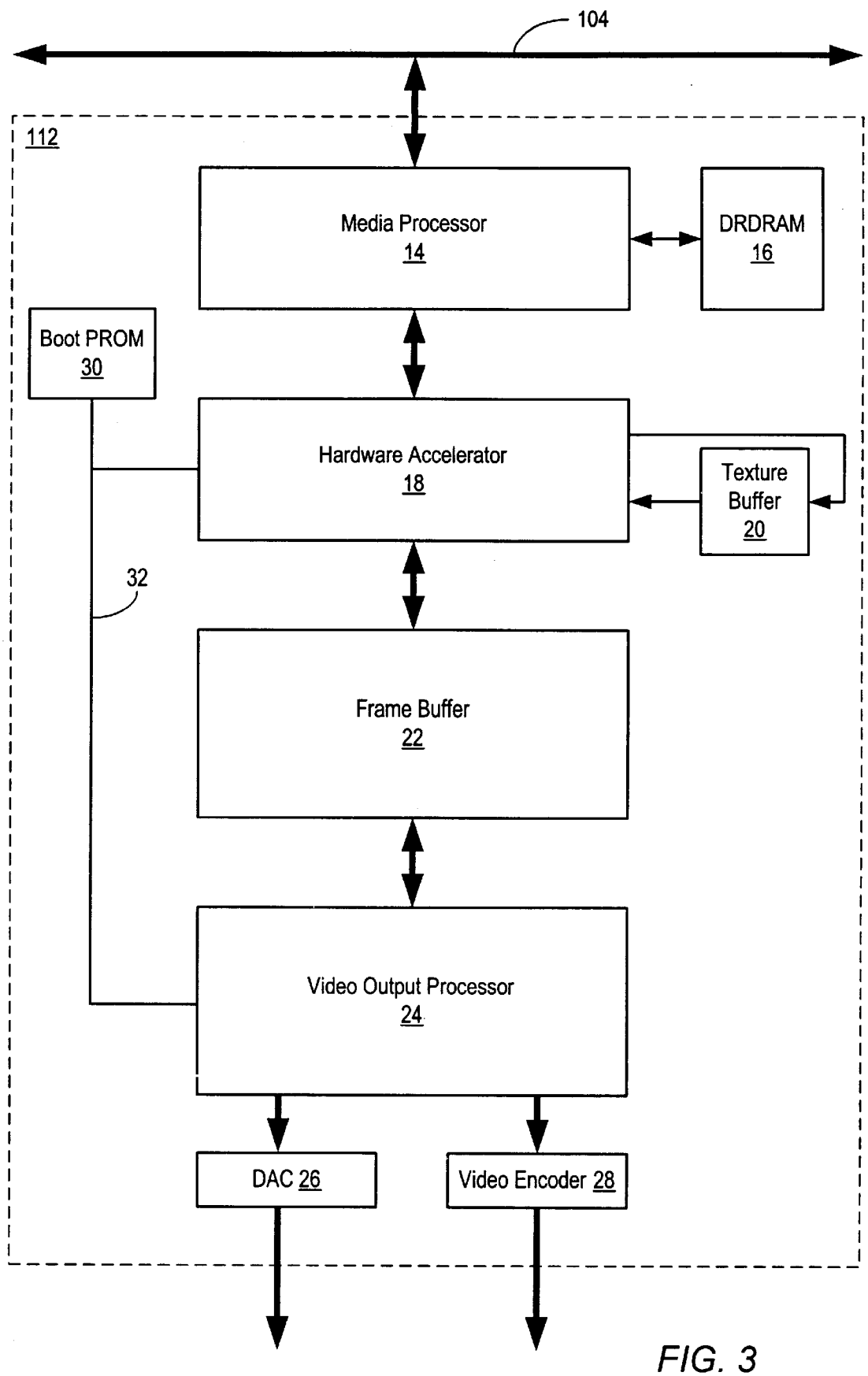
FIG. 3 is a functional block diagram of one embodiment of a graphics system.

Graphics System—FIG. 3

Referring now to FIG. 3, a functional block diagram illustrating one embodiment of graphics system 112 is shown. Note that many other embodiments of graphics system 112 are possible and contemplated. Graphics system 112 may comprise one or more media processors 14, one or more hardware accelerators 18, one or more texture buffers 20, one or more frame buffers 22, and one or more video output processors 24. Graphics system 112 may also comprise one or more output devices such as digital-to-analog converters (DACs) 26, video encoders 28, flat-panel-display drivers (not shown), and/or video projectors (not shown). Media processor 14 and/or hardware accelerator 18 may be any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality implemented in either or both of the media processor or the graphics accelerator may be implemented in software.

In some embodiments, media processor 14 and hardware accelerator 18 may be comprised within the same integrated circuit. In other embodiments, portions of media processor 14 and/or hardware accelerator 18 may be comprised within separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Each functional block of graphics system 112 is described in more detail below.

Figure 4:
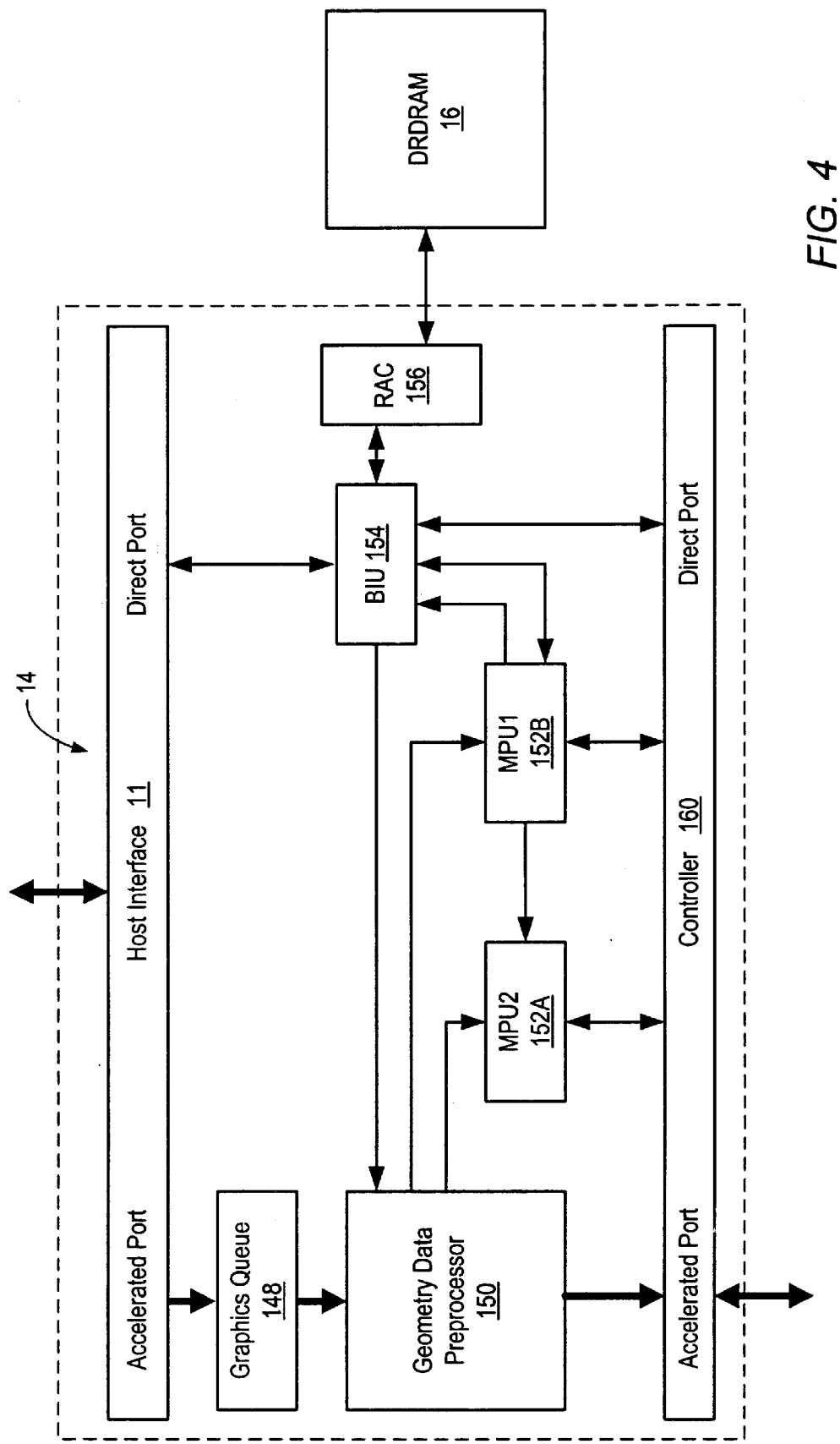
FIG. 4 is a functional block diagram of one embodiment of the media processor of FIG. 3.

Media Processor—FIG. 4

FIG. 4 shows one embodiment of media processor 14. As shown, media processor 14 operates as the interface between graphics system 112 and computer system 80 by controlling the transfer of data between graphics system 112 and computer system 80. In some embodiments, media processor 14 may also be configured to perform transform, lighting, and/or other general-purpose processing on graphical data.

Transformation refers to manipulating an object and includes translating the object (i.e., moving the object to a different location), scaling the object (i.e., stretching or shrinking), and rotating the object (e.g., in three-dimensional space, or "3-space").

Lighting refers to calculating the illumination of the objects within the displayed image to determine what color and or brightness each individual object will have. Depending upon the shading algorithm being used (e.g., constant, Gourand, or Phong), lighting may be evaluated at a number of different locations. For example, if constant shading is used (i.e., each pixel of a polygon has the same lighting), then the lighting need only be calculated once per polygon. If Gourand shading is used, then the lighting is calculated once per vertex. Phong shading calculates the lighting on a per-pixel basis.

As illustrated, media processor 14 may be configured to receive graphical data via host interface 11. A graphics queue 148 may be included in media processor 14 to buffer a stream of data received via the accelerated port of host interface 11. The received graphics data may comprise one or more graphics primitives. As used herein, the term graphics primitive may include polygons, parametric surfaces, splines, NURBS (non-uniform rational B-splines), sub-divisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transform and lighting calculations and programmable functions and to send results to hardware accelerator 18. MPUs 152 may also have read/write access to texels (i.e. the smallest addressable unit of a texture map, which is used to "wallpaper" a three-dimensional object) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to a memory. For example, as shown, media processor 14 may include direct Rambus interface 156 to a direct Rambus DRAM (DRDRAM) 16. A memory such as DRDRAM 16 may be used for program and data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface, such as bus interface unit (BIU) 154, which provides a direct port path to memory 16 and to hardware accelerator 18 and video output processor 24 via controller 160.

Figure 5:
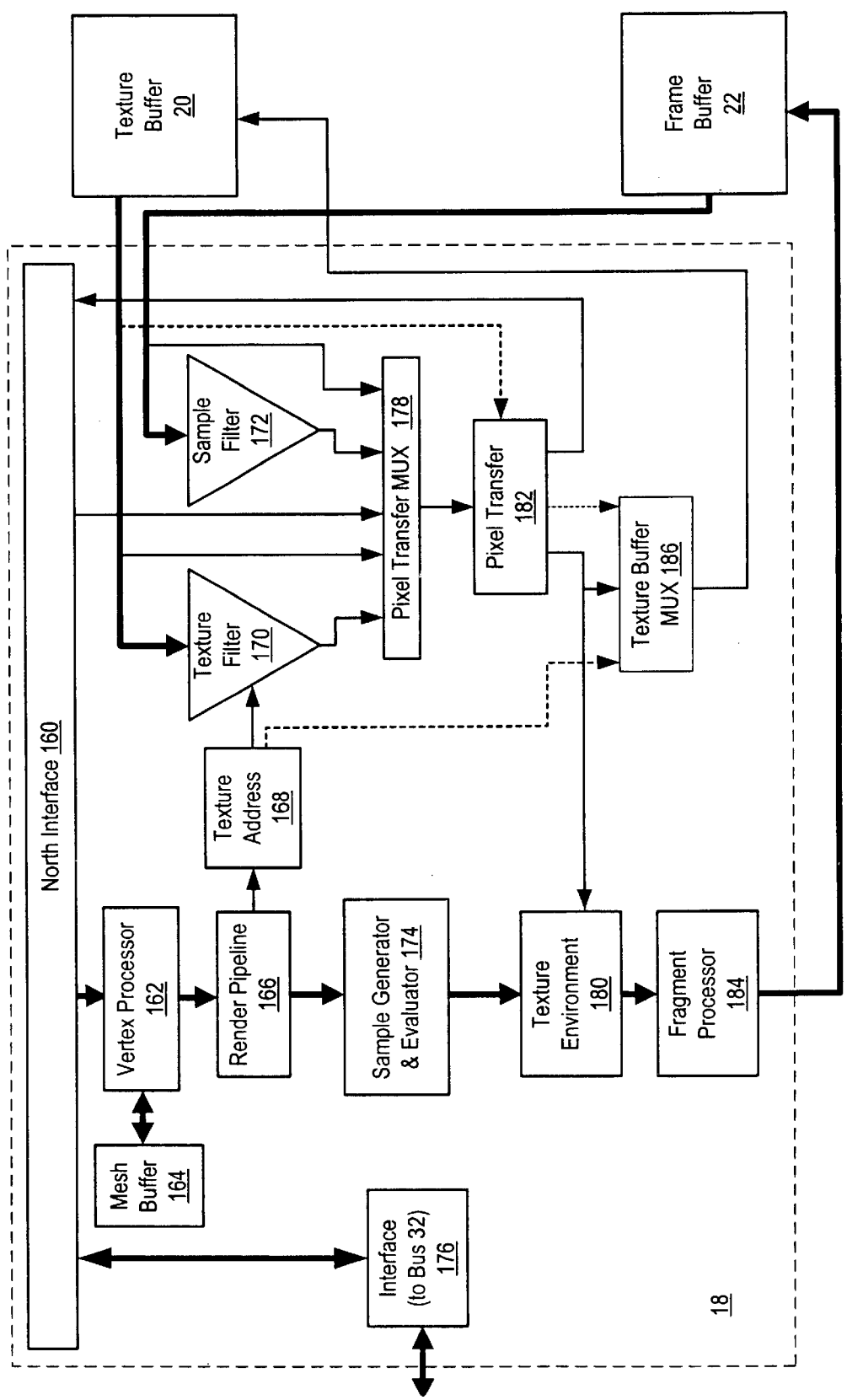
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and then to perform a number of functions on the received data according to the received instructions. For example, hardware accelerator 18 may be configured to perform rasterization, 2D or 3D texturing, pixel transfers, imaging, fragment processing, clipping, depth cueing, transparency processing, set-up, and/or screen space rendering of various graphics primitives occurring within the graphics data. Each of these features is described separately below.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window and a viewpoint located in world space. The solid truncated pyramid may be imagined as the union of all rays emanating from the viewpoint and passing through the view window. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculation performed to generate the data used to form each pixel that will be displayed. For example, hardware accelerator 18 may calculate "samples." Samples are points have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 160 (referred to as the "North Interface") to communicate with media processor 14. Hardware accelerator 18 may also be configured to receive commands from media processor 14 through this interface. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator

18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to receive vertices and convert them to fragments. The render pipeline 166 may be configured to rasterize 2D window system primitives (e.g., dots, fonts, Bresenham lines, polygons, rectangles, fast fills, and BLITs (Bit Block Transfers, which move a rectangular block of bits from main memory into display memory, which may speed the display of moving objects on screen)) and 3D primitives (e.g., smooth and large dots, smooth and wide DDA (Digital Differential Analyzer) lines, triangles, polygons, and fast clear) into pixel fragments. The render pipeline 166 may be configured to handle full-screen size primitives, to calculate plane and edge slopes, and to interpolate data down to pixel tile resolution using interpolants or components such as r, g, b (i.e., red, green, and blue vertex color); r2, g2, b2 (i.e., red, green, and blue specular color from lit textures); a (alpha); and z, s, t, r, and w (texture components).

In embodiments using supersampling, the sample generator 174 may be configured to generate samples from the fragments output by the render pipeline 166 and to determine which samples are inside the rasterization edge. Sample positions may be defined in loadable tables to enable stochastic sampling patterns.

Hardware accelerator 18 may be configured to write textured fragments from 3D primitives to frame buffer 22. The render pipeline 166 may send pixel tiles defining r, s, t and w to the texture address unit 168. The texture address unit 168 may determine the set of neighboring texels that are addressed by the fragment(s), as well as the interpolation coefficients for the texture filter, and write texels to the texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 160, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of and operations performed on the processed data, the pixel transfer unit 182 may then output the data to the texture buffer 20 (via the texture buffer MUX 186), the frame buffer 22 (via the texture environment unit 180 and the fragment processor 184), or to the host (via north interface 160). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer—20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Figure 6:
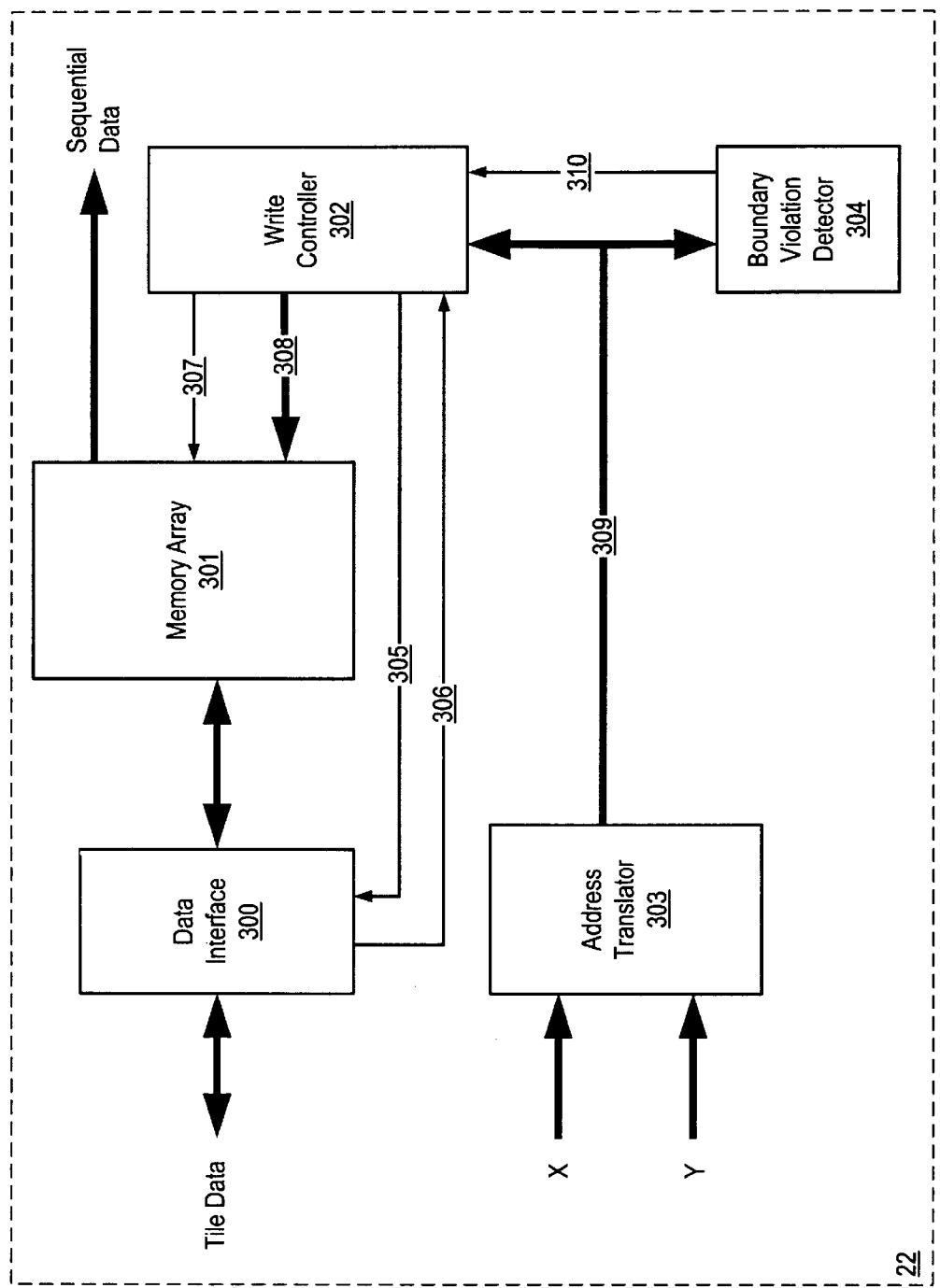
FIG. 6 is a functional block diagram of one embodiment of the frame buffer of FIG. 3.

One or more frame buffers 22 may be configured to receive and store data samples from hardware accelerator 18. In one embodiment, frame buffer 22 may take the form illustrated in FIG. 6. In order to increase the throughput of the graphics system, the frame buffer 22 may employ a tessellated design in which multiple data samples may be stored and retrieved simultaneously. The data samples from the hardware accelerator 18 may be grouped into arrays or tiles, with each tile being presented to the frame buffer 22 for storage. If, for example, the tile is two samples wide and two samples high, then there exists a potential increase in throughput of 4:1 as four samples may be stored in the frame buffer 22 in a single write operation.

The data sample tiles are buffered by the data interface 300, and may be reordered as necessary to ensure that each sample is delivered to the correct storage device of the memory array 301. Typically, this reordering may be accomplished through the use of a multiplexer in the data interface 300. In this example, the multiplexer (not shown) is directed by control signals 305 generated in the write controller 302, as explained in greater detail below. In addition to the multiplexing function, the data interface 300 may also examine the tile, and determine which of the sample locations within the tile are enabled. This sample enabled information 306 is conveyed to the write controller 302 and may there be employed in the generation of write sequences.

The address translator 303 receives the X and Y coordinates of the tile, and it calculates the corresponding address within the linear address space of the memory array 301. These X and Y coordinates may represent the position of the tile and the data it contains with respect to a virtual display area. Typically, this virtual display area will be a bounded plane, with its width and height expressed in samples. Therefore, one possible method of calculating the target memory address might comprise multiplying the Y coordinate by the width of the virtual display area and adding the X coordinate. The actual method employed may be dependent on several factors, including but not limited to the location of the origin within the coordinate system, any tessellation of the virtual display area, and randomization of sample locations. It is possible that some combinations of these and other factors may imply the use of a look-up table as a portion of the translation calculation.

In one embodiment, the memory array 301 may be designed as an array of storage elements, with the array comprising a multitude of rows and columns. The number of data samples within a tile may correspond to the number of columns in the array. This method may be used to tessellate the memory. In one embodiment, all devices in the array receive a common address, that defines a block of memory. Therefore, the block is the finest level of memory granularity which may be accessed by a tile. Additionally, each column within the array may receive a unique address which refers to a word within the memory block. Therefore, each data sample of a given tile may be stored in a unique word within a block of memory. The memory array 301 may also be configured to transfer large blocks of memory to an internal shift register. This shift register may then output the samples sequentially, according to an external clock 311 signal.

The boundary violation detector 304 may be configured to receive the target address location 309 of the tile within the memory array 301 along with information defining the tile dimensions. From this, a determination is made as to whether all the samples of the tile lie within a single block of memory as defined above. If the tile is found to overlap one or more boundaries between memory blocks, then the tile is subdivided and written to the array in an appropriate number of storage operations. In order to effect this, the boundary violation detector 304 conveys boundary crossing information 310 to the write controller 302 indicative of the nature and number of boundary crossings detected.

The write controller 302 generates write control signals 307 and addresses 308 for all storage operations to the memory array 301. The write controller 302 receives boundary crossing information 310 from the boundary violation detector 304, and in addition may also receive sample enabled information 306 from the data interface 300. From these two sources of information, a determination may be made as to the number of storage operations required to store a given tile. If multiple storage operations are required, the write controller 302 may use the target memory address 309 from the address translator 303 in conjunction with knowledge of the tile size to generate coherent addresses for each of the storage operations.

Memory Array 301

Figure 7:
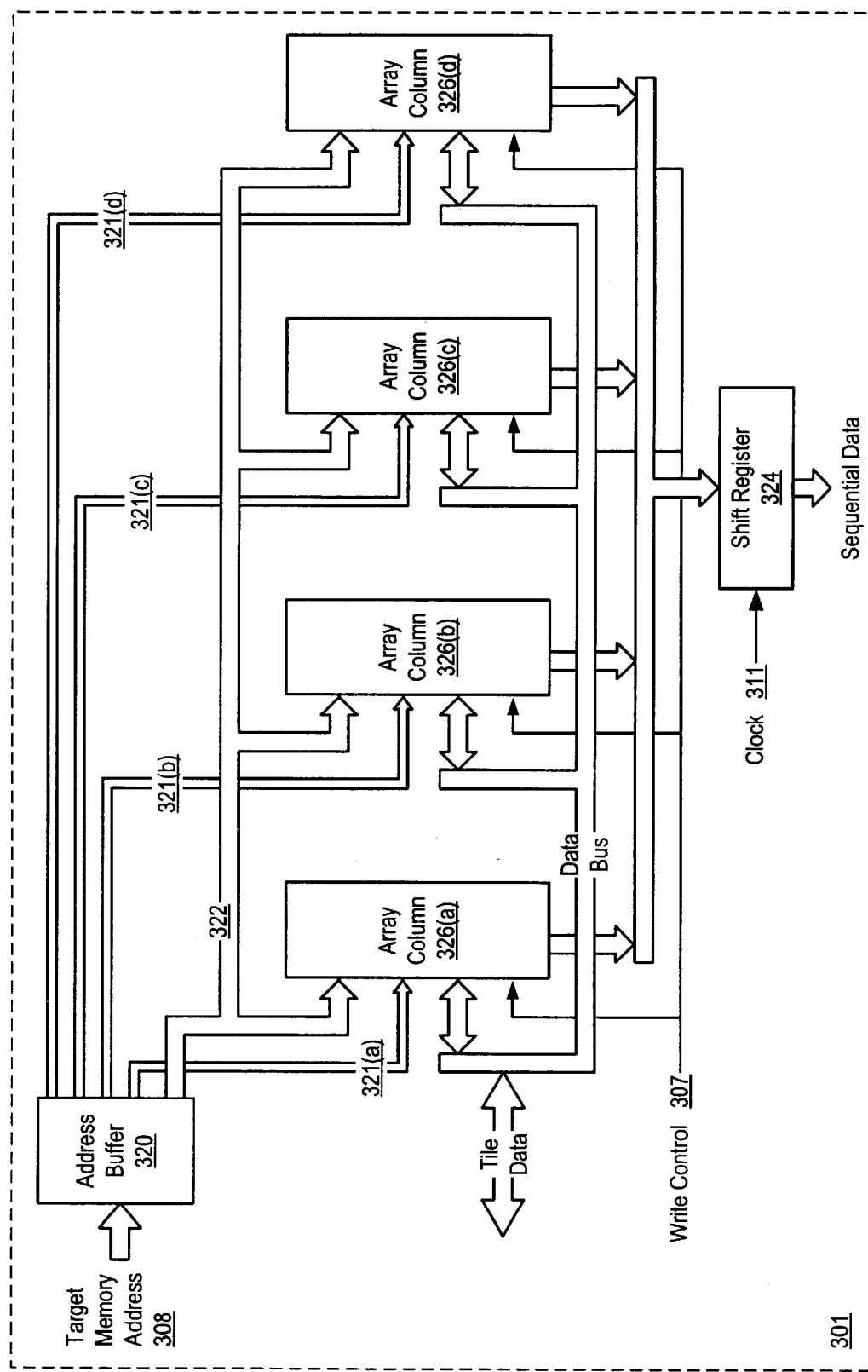
FIG. 7 is a simplified block diagram of one embodiment of the memory array of FIG. 6.

Turning now to FIG. 7, one embodiment of memory array 301 is illustrated. The target memory address 308 of a tile, which is delivered from the write controller 302, is buffered by address buffer 320. The target memory address 308 may be decomposed into a group of word address buses 321 and a common address bus 322. The common address bus 322 may be comprised of a hierarchy of high level memory segmentations having "banks", "pages", and "blocks", with "blocks" being the finest level of granularity with which all the storage devices 323 in the array may be commonly accessed. The word address buses 321 may be unique to each array column 326. As the array is addressed, all storage devices 323 in the array may be directed to a common block of memory, and each array column 326 may be directed to a given word within that block.

Write control 307 signals corresponding to storage operations are received by the memory array 301. These signals may be encoded with information enabling a specific storage device 323 within a column. Data stored in the array may be transferred in large blocks to one or more shift registers 324, which in turn output the data sequentially according to an external clock 311 signal.

Figure 8:
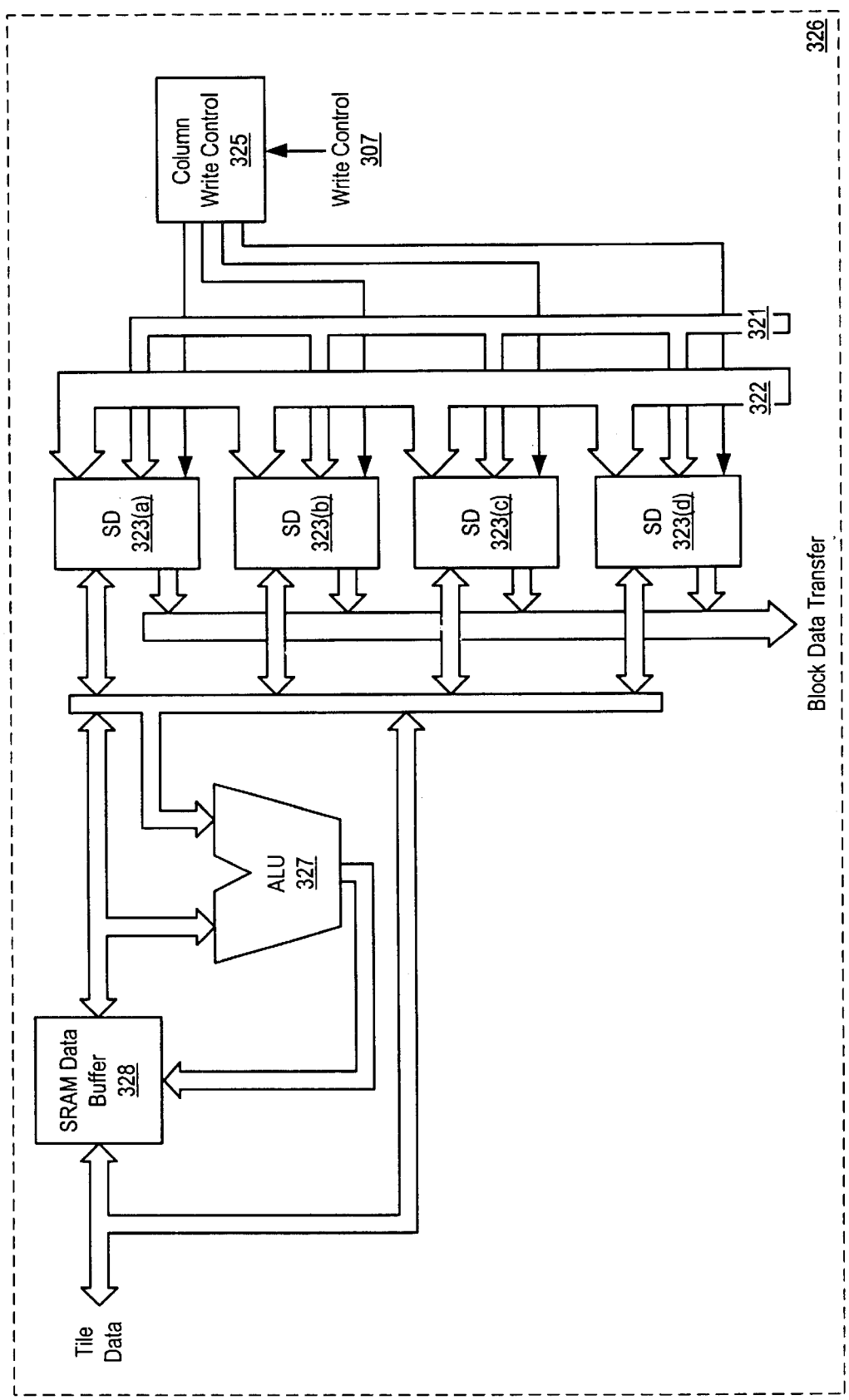
FIG. 8 is a simplified block diagram of one embodiment of the array column of FIG. 7.

Turning now to FIG. 8, one embodiment of an array column 326 is illustrated in greater detail. Tile data may be temporarily stored in SRAM data buffer 328, prior to storage in the storage devices 323. The SRAM data buffer 328 may comprise memory devices with a faster access time than the storage devices 323, thus providing the opportunity for data manipulation or combination with low impact on system throughput. The SRAM data buffer 328 may be connected to an arithmetic logic unit (ALU) 327 allowing for an arithmetic combination or z-buffer compare of new tile data with data currently residing in storage. Column write controller 325 may decode the write control information 307 from the write controller 302 and issue the appropriate control signals to the storage device 323 in the column which is the target of the current retrieve or storage operation. In some embodiments, the elements shown in FIG. 8, may reside in a single memory device such as a 3D-RAM or 3D-RAM-64.

From the previous description, it can be seen that each storage device 323 storing a data sample may receive the same memory block address. Consequently, a tile which does not lie completely within the boundaries of a memory block will preclude storage as a single unit. This situation is detailed in the four cases illustrated in FIG. 9.

Figure 9:
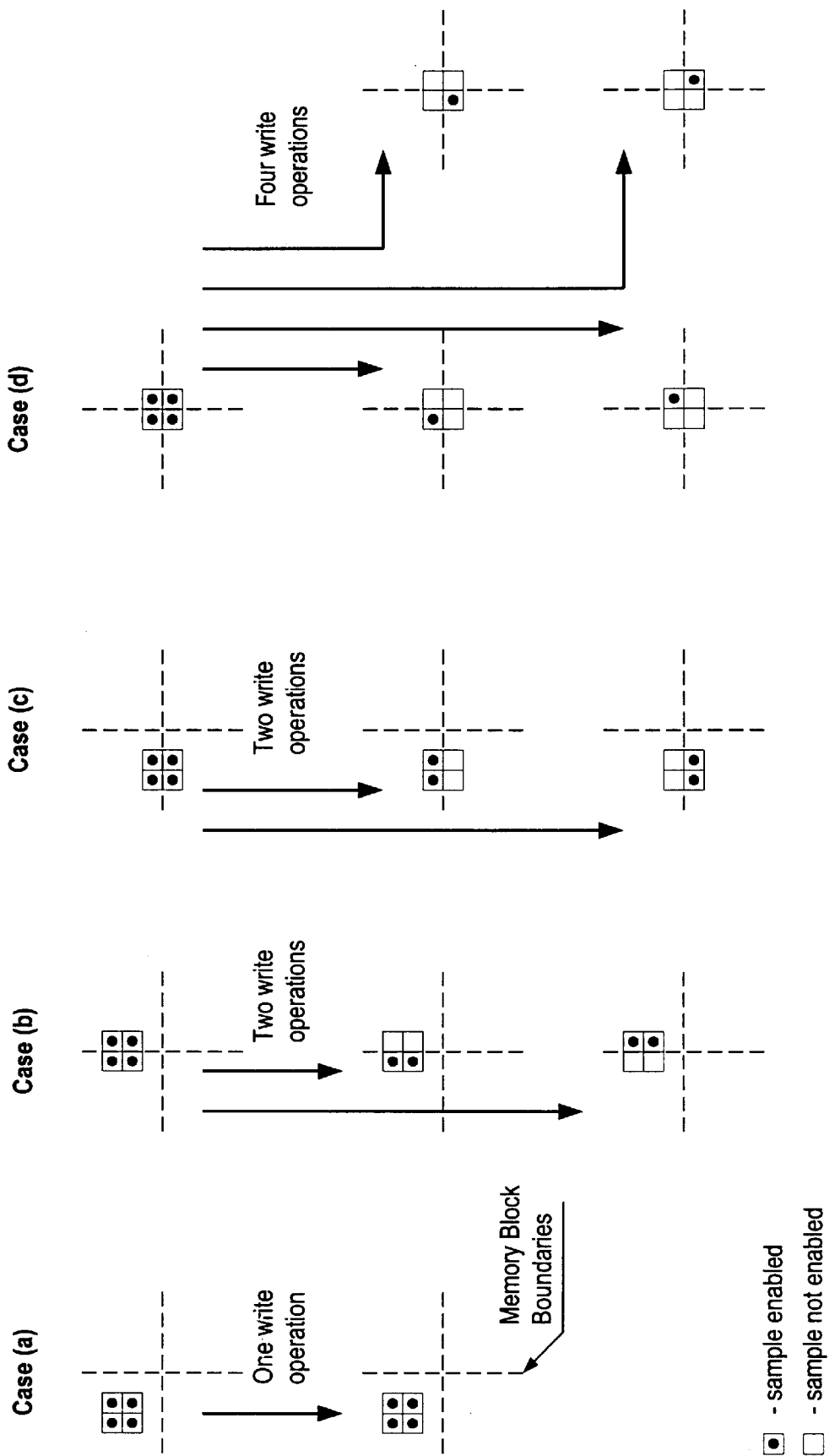
FIG. 9 is a diagrammatic illustration of various tile boundary violations.

Turning now to FIG. 9, in case (a), the tile lies completely within the boundaries of a common memory block, and therefore one memory write operation is exercised, with each column of the memory array 301 receiving one of the data samples. In case (b) the tile overlaps the boundary between two horizontally contiguous memory blocks. The two blocks of memory affected by the potential storage operation may not be accessed simultaneously since all storage devices 323 receive common block addresses, therefore the storage process is split into two independent write operations, each storing one half of the original tile. Case (c) is similar to case (b) except the tile to be stored overlaps the boundary between two vertically contiguous memory blocks. Case (d) is representative of the worst case scenario. The tile to be stored violates both a horizontal and a vertical boundary. Therefore, the storage operation is split into four independent write operations, each storing one-quarter of the original tile.

Figure 10:
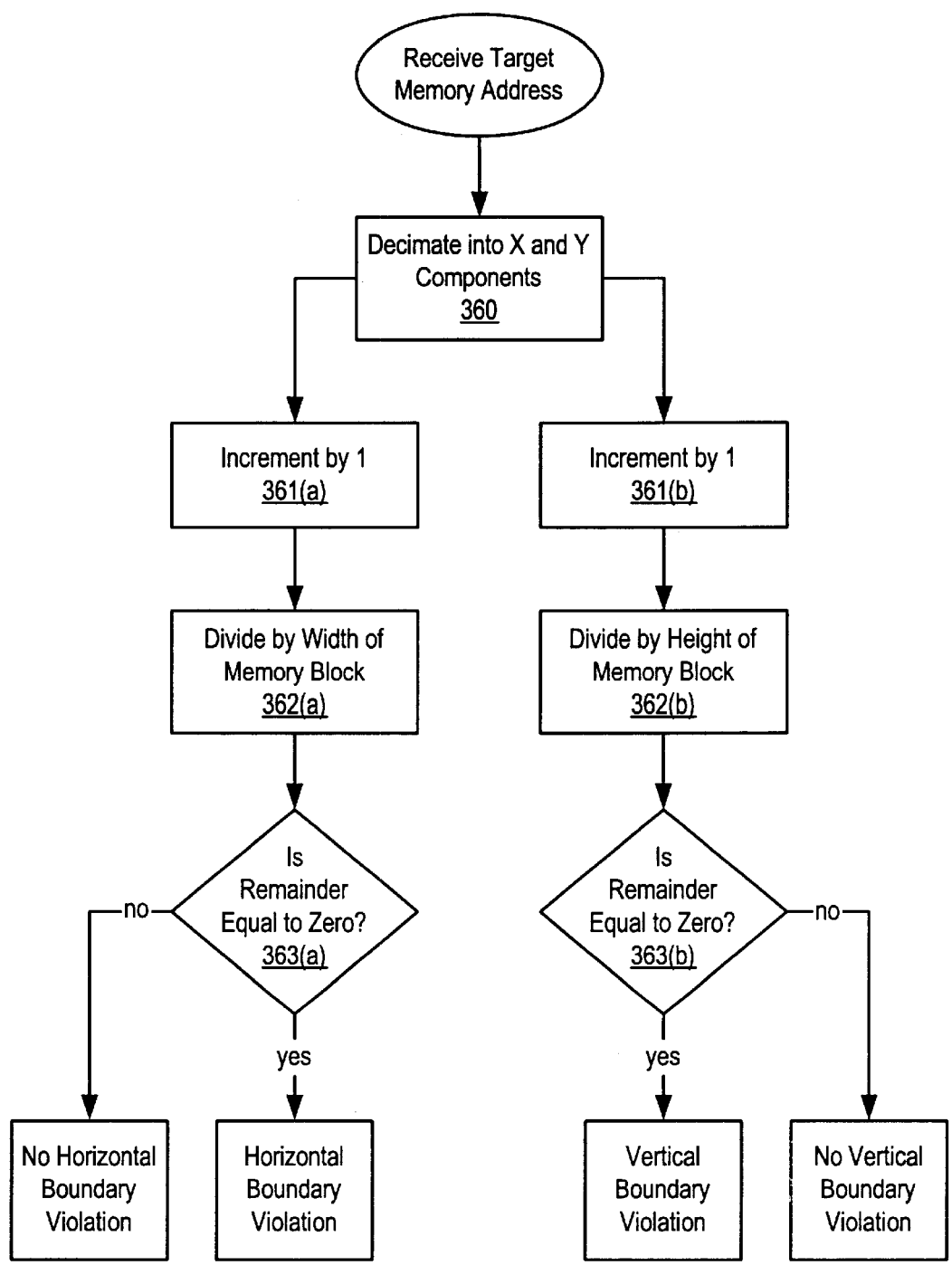
FIG. 10 is diagrammatic illustration of one embodiment of a method of detecting boundary violations.

In order to streamline the data flow through the memory array 301, an efficient method for detecting each of the four boundary violation cases as described above is needed. Referring now to FIG. 10, one embodiment of a method for boundary violation detection is outlined. This flow diagram assumes a tile size of two by two samples.

Before detecting boundary violations, the boundaries must be defined. This is generally a function of the memory array hardware, as the size of a memory block is typically dictated by that architecture. For example, in a memory array built around DRAM storage devices, SRAM caches may be employed by a bank of memory to decrease access times of spatially related data. In such an example, the size of the cache may define the memory block size. Furthermore, the memory blocks may be arranged into rows and columns, with the number of blocks in each row and column being dependent on the size and aspect of the display system employed by the graphics system.

Once the memory block boundaries are defined, the first step is to decimate the target memory address (step 360). The target memory address exists in a linear address space, and may be decimated into X and Y components according to the display space as described above. In practice, the sizes of the tile and of the memory blocks will be a power of two, and consequently this decimation reduces to splitting the target memory address into four contiguous binary fields. Field 1 begins with the least significant bit of the target memory address. The length of this field will be a number of bits m, where $2^m$ is equal to the width of the memory block. Field 2 may be j bits in length, where $2^j$ is equal to the width of the display space in memory blocks. Field 3 will be n bits in length, where $2^n$ is equal to the height of a memory block. Field 4 will comprise the remaining bits, and will be k bits in length, where 2k is equal to the height of the display space in memory blocks. Therefore, field 1 and field 3 correspond to the X and Y coordinate location of the target memory address within a given memory block.

Typically, the target memory address will correspond to the storage location of the data sample residing in the first row of the first column of the tile. Therefore adding one (step 361) to fields 1 and 3 as described above, will yield the X and Y coordinate location of the data sample residing in the second row of the second column. In one embodiment, a tile two samples wide and two samples high is used, this sample represents the worse case for potential boundary violations. Therefore, if the incremented X and Y coordinates lie outside of the boundaries of the memory block, a violation is indicated. This can be tested by performing a modulo operation (step 362) on both the X and Y coordinates, using the memory block width and height as the modulus respectively. If the result of the modulo operation is identically zero (step 363), a violation is indicated. This is obvious as the tile is two samples wide by two samples high, and therefore if it intrudes into an adjacent memory block, it is unable do so by more than one row, or one column.

Boundary Violation Detector 304

Figure 11:
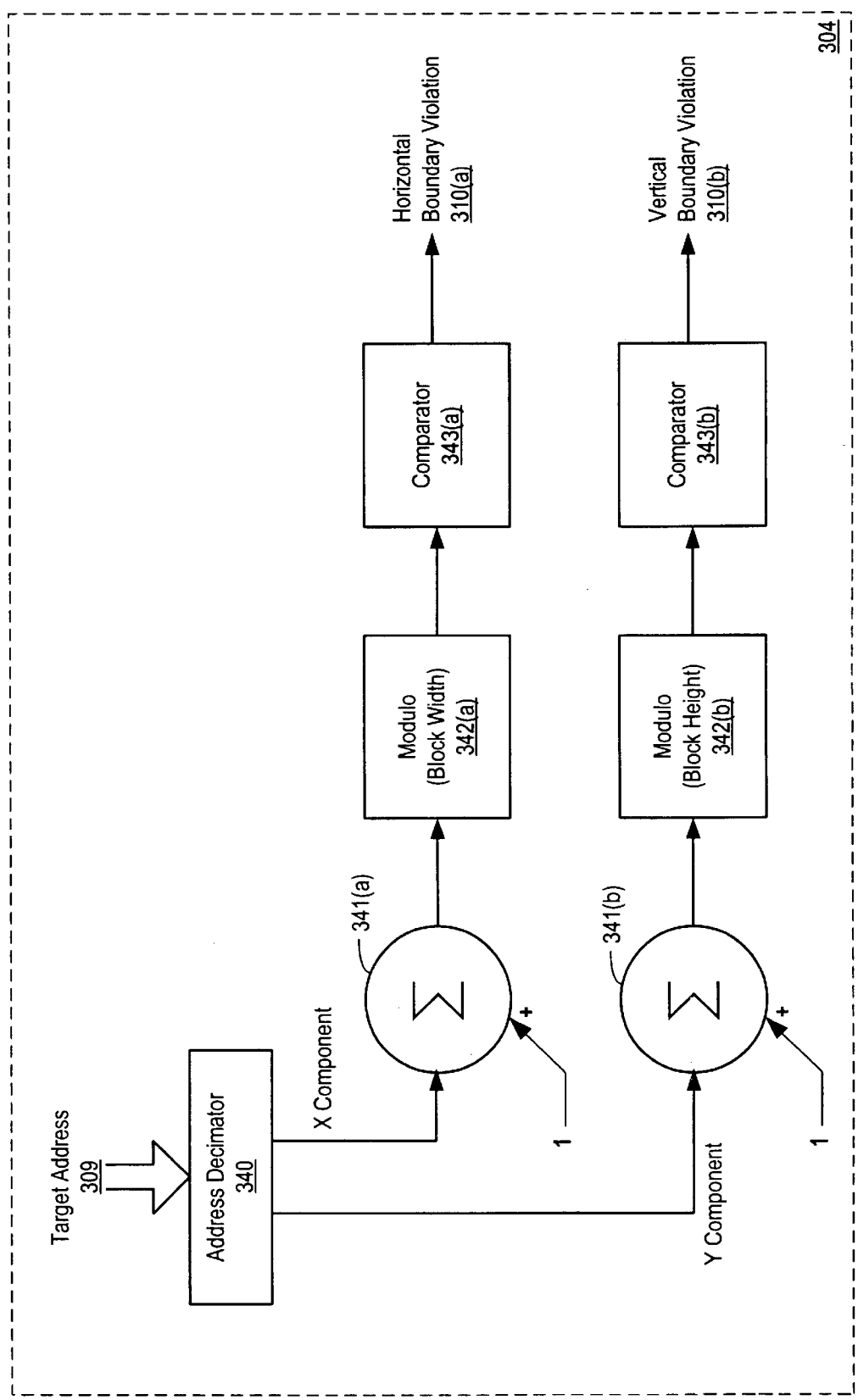
FIG. 11 is a functional block diagram of one embodiment of the boundary violation detector of FIG. 6.

Turning now to FIG. 11, one embodiment of a boundary violation detector 304 suitable to implement the violation detection scheme described above is illustrated. In one embodiment, the address decimator 340 acts as a buffer for the appropriate bits extracted from the target memory address 309 (representing field 1 and field 3 as described above). The two fields, corresponding to the X and Y coordinates within a memory block are coupled to the adders 341, where each is incremented by one. The output of the adders is coupled to the logic performing the modulo operation 342. In one embodiment, the dimensions of a memory block are constant and equal to powers of two. The logic involved in performing the modulo operation may perform a simple truncation, thus preserving the least significant p bits, where $2^p$ is equal to the modulus of the operation. The results of the modulo operation are then coupled to comparators which test for zero equality. If either of the two results are zero, then the associated boundary violation 310 is indicated and asserted.

Write Controller 302

Figure 12:
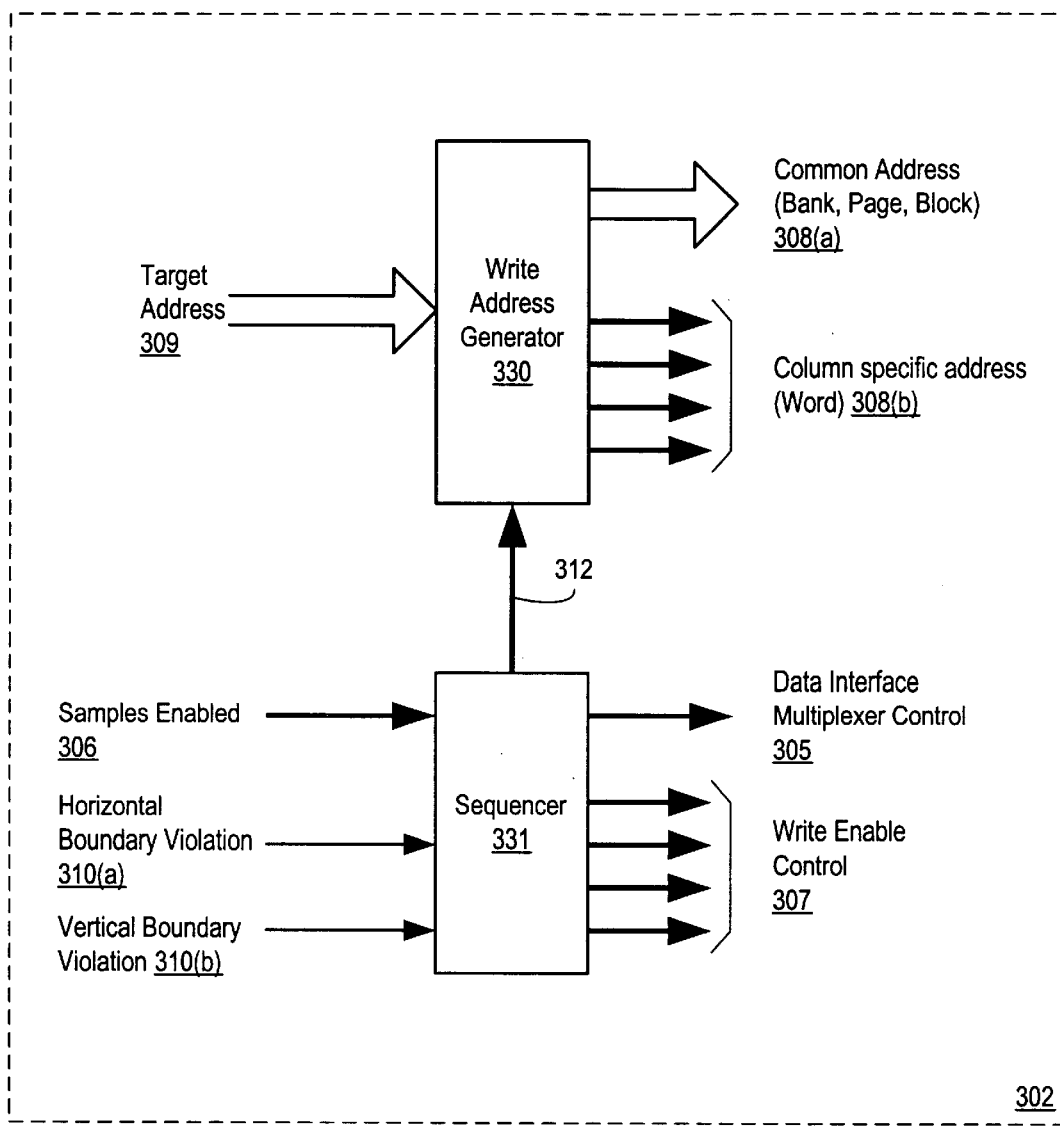
FIG. 12 is a simplified block diagram of one embodiment of the write controller of FIG. 6.

Turning now to FIG. 12, one embodiment of the write controller 302 is shown in detail. The purpose of the write controller 302 in this embodiment is to control access to the memory based on the target memory address 309 of the supersample tile, the boundary violation information 310, and sample enabled information 306 in order to generate the multiple write addresses 308, write sequences, and any multiplexer control signals 305 as needed.

The sequencer 331 may receive sample enabled information 306 from the data interface 300 along with horizontal 310(a) and vertical 310(b) boundary violations from the boundary violation detector 304. From these inputs, the sequencer 331 is able to determine the number of write operations that will be needed to store the tile. For example, if either a horizontal or vertical boundary violation 310 is indicated, then two storage operations are indicated. If, however, both violation indicators 310 are asserted, then four storage operations can be expected. Whether all of the indicated storage operations will be performed is further dependent on whether the associated sub-tiles contain enabled data.

The sequencer 331 may issue write enable controls 307 directly to the memory array 301, each corresponding to a storage operation. Additionally, the sequencer 331 may provide control signals 312 to the write address generator 330 described below. Multiplexer control signals 305 may also be generated and communicated to the data interface 300 to ensure that the data samples within the tile or sub-tiles are routed to the correct columns within the memory array 301.

In this embodiment, the write address generator 330 receives control signals 312 from the sequencer 331 along with the target memory address 309. The write address generator 330 responds to these inputs by generating the correct sequence of common addresses to direct the tile or sub-tiles to the correct memory blocks, and column specific addresses to further direct data samples within the tile or sub-tiles to the correct words within those memory blocks.

Figure 13:
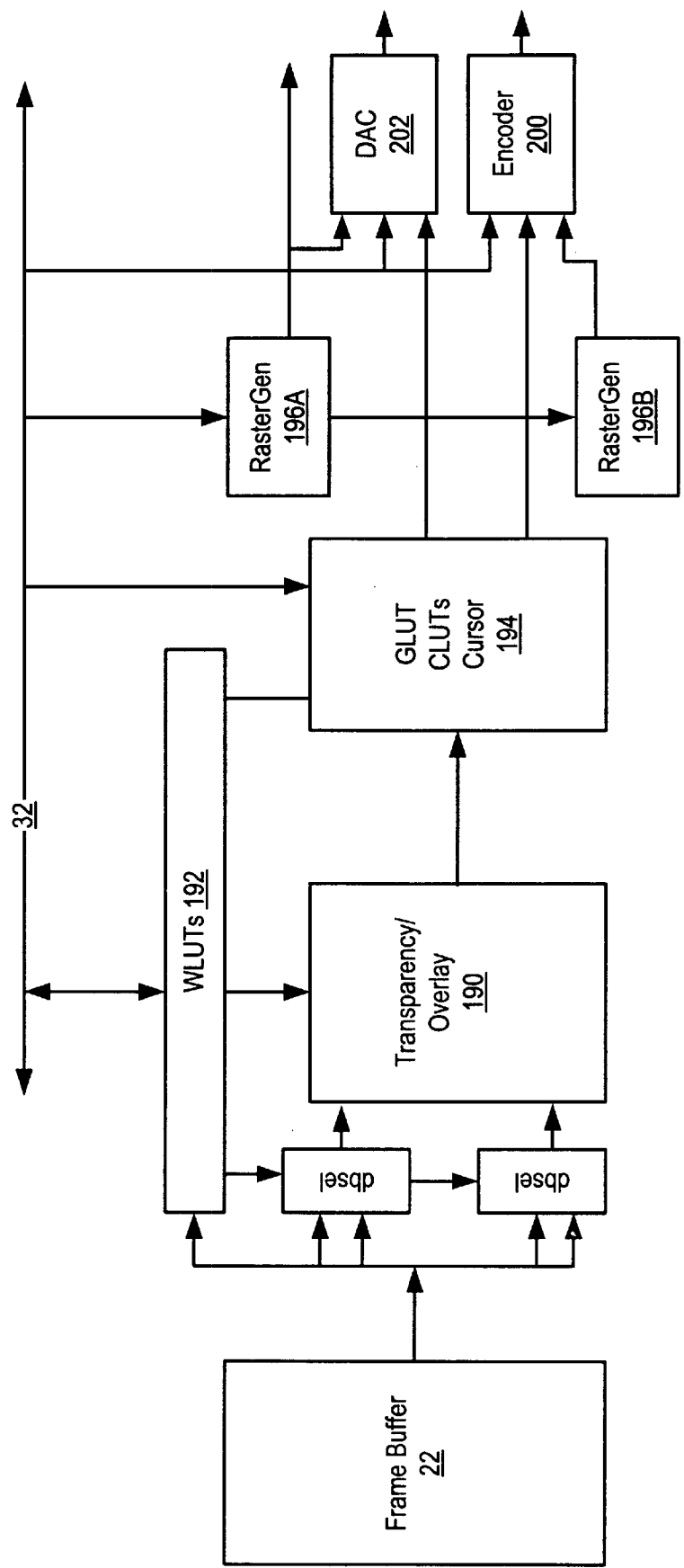
FIG. 13 is a functional block diagram of one embodiment of the video output processor of FIG. 3.

Video Output Processor—FIG. 13

Turning now to FIG. 13, one embodiment of a video output processor 24 is shown. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, pseudocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3 DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 202 may operate as the final output stage of graphics system 112. The DAC 202 translates the digital pixel data received from GLUT/CLUTs/Cursor unit 194 into analog video signals that are then sent to a display device. In one embodiment, DAC 202 may be bypassed or omitted completely in order to output digital pixel data in lieu of analog video signals. This may be useful when a display device is based on a digital technology (e.g., an LCD-type display or a digital micro-mirror display).

DAC 202 may be a red-green-blue digital-to-analog converter configured to provide an analog video output to a display device such as a cathode ray tube (CRT) monitor. In one embodiment, RGB DAC 202 may be configured to provide a high resolution RGB analog video output at dot rates of 240 MHz. Similarly, encoder 200 may be configured to supply an encoded video signal to a display. For example, encoder 200 may provide encoded NTSC or PAL video to an S-Video or composite video television monitor or recording device.

In other embodiments, the video output processor 24 may output pixel data to other combinations of displays. For example, by outputting pixel data to two DACs 202 (instead of one DAC 202 and one encoder 200), video output processor 24 may drive two CRTs. Alternately, by using two encoders 200, video output processor 24 may supply appropriate video input to two television monitors. Generally, many different combinations of display devices may be supported by supplying the proper output device and/or converter for that display device.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A graphics system comprising:
   a memory configured to receive and store a tile of graphics data;
   a boundary violation detector connected to the memory, wherein the boundary violation detector is configured to receive an address corresponding to the tile and determine if the tile will cross a memory block boundary; and
   a write controller connected to the memory and the boundary violation detector, wherein the write controller is configured to split the tiles that cross the memory block boundaries.

2. The graphics system of claim 1, wherein the tile of graphics data comprises a number of elements, wherein the number of elements is greater than one, wherein each element is an independent unit of graphics data, and wherein each independent unit of graphics data is a pixel.

3. The graphics system of claim 1, wherein the tile of graphics data comprises a number of elements, wherein the number of elements is greater than one, wherein each element is an independent unit of graphics data, wherein each independent unit of graphics data is a supersample, and wherein each supersample is a submultiple of a pixel.

4. The graphics system of claim 1, wherein the size of the memory blocks is variable, and wherein the boundary violation detector is configured to determine if the tile will cross one or more variable block boundaries.

5. The graphics system of claim 1, wherein the memory is partitioned to store sets of graphics data, wherein the number of sets is greater than 1.

6. The graphics system of claim 5, wherein the sets of graphics data have different sizes.

7. The graphics system of claim 1, wherein the memory further comprises:
   an array of storage devices; and
   a shift register connected to the array, wherein the shift register is configured to receive and store blocks of the graphics data from the array, wherein the blocks of the graphics data comprise a plurality of independent units of the graphics data, and wherein the shift register is further configured to output the independent units of the graphics data sequentially, in response to an external clock signal.

8. The graphics system of claim 1, wherein the memory comprises 3D-RAM storage devices.

9. The graphics system of claim 8, wherein the write controller further comprises:
   a sequencer, wherein the sequencer generates a number of write operations equal to the number of sub-tiles; and
   a write address generator connected to the sequencer, wherein the write address generator generates a unique memory address for each sub-tile.

10. The graphics system of claim 8, wherein the write controller further comprises:
    a sequencer, wherein the sequencer is coupled to the memory, and wherein the sequencer generates a number of write operations equal to the number of sub-tiles, and wherein the sequencer is coupled to the multiplexer, wherein the sequencer generates the control signals to re-order the elements within a tile; and
    a write address generator coupled to the sequencer, wherein the write address generator generates a unique memory address for each sub-tile.

11. The graphics system of claim 1, wherein the write controller is configured to split the tiles that cross memory boundaries into sub-tiles according to the memory block boundaries, wherein the sub-tiles represent unique non-intersecting subsets of the tile, and wherein each element belongs to one and only one sub-tile.

12. The graphics system of claim 1, wherein the memory further comprises a multiplexer, wherein the multiplexer is connected to the memory, wherein the multiplexer is configured to receive the tile, and wherein the multiplexer is further configured to re-order the elements within the tile in response to external controls signals.

13. The graphics system of claim 1, wherein the memory is configured to arithmetically combine the tile with a tile previously stored in the memory, wherein the result of the arithmetical combination is stored back to the memory.

14. The graphics system of claim 1, wherein the graphics system further comprises a display device for displaying an image according to the graphics data.

15. A method for rendering graphics data, the method comprising:
    receiving a tile of graphics data;
    receiving a target memory address for the tile of graphics data;
    decimating the target memory address into X and Y components, wherein the X and Y components are virtual memory addresses, wherein the minimum value of the X and Y components is zero, wherein the maximum value of the X component is less than an integer constant j times the width of a block in the memory, wherein the maximum value of the Y component is less than an integer constant k times the height of a block in the memory;
    incrementing the X component by a number equal to the tile width minus 1;
    incrementing the Y component by a number equal to the tile height minus 1;
    dividing the incremented X component by the width of the block of memory;
    dividing the incremented Y component by the height of the block of memory;
    examining the remainders of each of the divisions, wherein if one or more of the remainders are zero, then a crossing of the associated block of memory boundary is indicated;
    storing the tile of graphics data in a number of blocks of memory according to the crossing of the boundary or boundaries of the block of memory;
    retrieving the tile of graphics data from the block or blocks of memory; and
    displaying the retrieved tile of graphics data on a display device.

16. The method of claim 15, wherein the target memory address is within a linear address space of a memory, and wherein the target memory address corresponds to a storage location, wherein the storage location corresponds to the first element of the tile.

17. The method of claim 15, wherein the integer constant j is equal to the integer constant k.

18. The method of claim 15, further comprising:
examining each element of the tile, wherein elements which contain no data are flagged;
combining the result of each of the element examinations with two boundary crossing indicators, wherein if a boundary crossing indicator is asserted, and all of the elements of the tile which violate an associated boundary contain no data, then the boundary crossing indicator is nullified.

19. The method of claim 15, wherein the division of the X and Y components is accomplished by performing a binary shift operation.

20. The method of claim 15, wherein the integer constant j times the integer constant k times the width of the block of memory times the height of the block of memory is equal to the total number of storage locations available in the memory.

21. A method for storing a tile of graphics data, wherein the tile crosses one or more memory block boundaries, wherein the width of the memory block is equal to $2^n$ samples, and wherein the height of the memory block is equal to $2^m$ samples, the method comprising:
receiving a target memory address of a tile, wherein the target memory address is within a linear address space of the memory, and wherein the target memory address corresponds to a storage location, wherein the storage location corresponds to the first element of the tile;
decimating the target memory address into four binary fields, f1, f2, f3 and f4, wherein each field comprises a unique subset of contiguous bits from the target memory address;
examining f1, wherein if the content of f1 is greater than n minus the tile width, then a horizontal boundary violation is indicated;
examining f3, wherein if the content of f3 is greater than to m minus the tile height, then a vertical boundary violation is indicated;
splitting the tile into sub-tiles in accordance with the horizontal and vertical boundary violation indications; and
storing the sub-tiles in the memory.

22. The method of claim 21, wherein the least significant bit of f1 is aligned with the least significant bit position of the target memory address, wherein f1 is n bits in length, wherein the least significant bit of f2 is aligned with the least significant bit of the target memory address not contained within f1, wherein f2 is j bits in length, wherein $2^j$ is equal to the width of a virtual memory space measured in memory blocks, wherein the least significant bit of f3 is aligned with least significant bit of the target memory address not contained in f1 and f2, wherein f3 is m bits in length, wherein the least significant bit of f4 is aligned with the least significant bit of the target memory address not contained in f1, f2, and f3, wherein f4 is k bits in length, wherein k is equal to the number of bits in the target memory address minus the number of bits contained in f1, f2 and f3, and wherein $2^k$ is equal to the height of the virtual memory space measured in memory blocks.

23. The method of claim 21, wherein n minus the tile width represents a constant value, wherein m minus the tile height represents a constant value, wherein f1 is examined by comparing the content of f1 with the constant value equal to n minus the tile width, and wherein f3 is examined by comparing the content of f3 with the constant value equal to m minus the tile height.

24. The method of claim 21, wherein the tile height is equal to the tile width, wherein m and n are constant values, wherein the value of m is equal to the value of n, and wherein f1 and f3 are examined by comparing the content of f1 and the content of f3 with the constant value equal to m minus the tile width.

25. The method of claim 21, wherein f1 is examined by adding it to the value of the tile width minus m, wherein if the result of the addition is greater than zero, then a horizontal boundary violation is indicated, wherein f3 is examined by adding it to the value of the tile height minus n, wherein if the result of the addition is greater than zero, then a vertical boundary violation is indicated.

26. A method for storing an array of pixels or samples, wherein the array crosses one or more memory block boundaries, wherein the memory block width is equal to $2^n$ samples, wherein the memory block height is equal to $2^m$ samples, wherein the width of the array of pixels or samples is equal to two, and wherein the height of the array of pixels or samples is equal to two, the method comprising:
receiving a target memory address of the array, wherein the target memory address is within a linear address space of a memory, and wherein the target memory address corresponds to the storage location of the element residing in the first row of the first column of the array; and
decimating the target memory address into four binary fields, f1, f2, f3 and f4, wherein each field comprises a unique subset of contiguous bits from the target memory address,
examining f1, wherein if all the bits within f1 are equal to 1, then a horizontal boundary violation is indicated;
examining f3, wherein if all the bits of f3 are equal to 1, then a vertical boundary violation is indicated;
splitting the tile into sub-tiles in accordance with the horizontal and vertical boundary violation indications; and
storing the sub-tiles in the memory.

27. The method of claim 26, wherein the least significant bit of f1 is aligned with the least significant bit position of the target memory address, and wherein f1 is n bits in length, wherein the least significant bit of f2 is aligned with the least significant bit of the target memory address not contained within f1, and wherein f2 is j bits in length, wherein $2^j$ is equal to the width of a virtual memory space measured in memory blocks, wherein the least significant bit of f3 is aligned with least significant bit of the target memory address not contained in f1 and f2, and wherein f3 is m bits in length, wherein the least significant bit of f4 is aligned with the least significant bit of the target memory address not contained in f1, f2 and f3, and wherein f4 is k bits in length, wherein k is equal to the number of bits in the target memory address minus the number of bits contained in f1, f2 and f3, wherein $2^k$ is equal to the height of the virtual memory space measured in memory blocks.

28. The method of claim 26, further comprising:
examining each element of the array, wherein elements which contain no data are flagged;
combining the examination of the array elements with the examination of f1 and f3, wherein if all the bits of f1 are equal to 1 and either of the elements of column 1 of the array contain pixel or sample data, then a horizontal boundary violation is indicated, wherein if all the bits of f3 are equal to 1 and either of the elements of row 1 of the array contain pixel or sample data, then a vertical boundary violation is indicated, wherein the columns of the array are labeled 0 and 1, and wherein the rows of the array are labeled 0 and 1.

29. The method of claim 26, wherein the decimation of the target memory address results only in f1 and f3, wherein the least significant bit of f1 is aligned with bit 0 of the target memory address, wherein f1 is m bits in length, wherein the least significant bit of f3 is aligned with bit p, wherein p is equal to j plus m, and wherein f3 is n bits in length.

30. The method of claim 26, wherein the array comprises supersamples, wherein the supersamples have no direct correlation to pixels.

31. A method for storing an array of graphics data, the method comprising:
  receiving a two-dimensional array of graphics data, wherein the array comprises a number of samples, wherein the number of samples is greater than one;
  determining whether the array crosses one or more memory block boundaries;
  splitting the arrays that cross boundaries into sub-arrays, wherein each sub-array comprises a subset of the samples contained in the corresponding array, wherein each sub-array lies completely within a single memory block;
  examining the sub-arrays for enabled samples, wherein enabled samples of the sub-arrays are flagged; and
  generating a sequence of write operations to store the sub-arrays, wherein the number of write operations is equal to the number of sub-arrays with enabled samples.

32. The method of claim 31, wherein the determination whether the tile crosses a memory block boundary comprises:
  receiving a tile of graphics data;
  receiving a target memory address for the tile of graphics data, wherein the target memory address is within a linear address space of a memory, and wherein the target memory address corresponds to a storage location, wherein the storage location corresponds to the first element of the tile;
  decimating the target memory address into X and Y components, wherein the X and Y components are virtual memory addresses, wherein the minimum value of the X and Y components is zero, wherein the maximum value of the X component is less than an integer constant j times the width of a block in the memory, wherein the maximum value of the Y component is less than an integer constant k times the height of a block in the memory;
  incrementing the X component by a number equal to the tile width minus 1;
  incrementing the Y component by a number equal to the tile height minus 1;
  dividing the incremented X component by the width of the block of memory;
  dividing the incremented Y component by the height of the block of memory; and
  examining the remainders of each of the divisions, wherein if one or more of the remainders are zero, then a crossing of the associated block of memory boundary is indicated.

33. The method of claim 31, wherein the width of the memory block is equal to $2^n$ samples, and wherein the height of the memory block is equal to $2^m$ samples, wherein the determination whether the tile crosses a memory block boundary comprises:
  receiving a target memory address of a tile, wherein the target memory address is within a linear address space of the memory, and wherein the target memory address corresponds to a storage location, wherein the storage location corresponds to the first element of the tile; and
  decimating the target memory address into four binary fields, f1, f2, f3 and f4, wherein each field comprises a unique subset of contiguous bits from the target memory address;
    wherein the least significant bit of f1 is aligned with the least significant bit position of the target memory address, and wherein f1 is n bits in length,
    wherein the least significant bit of f2 is aligned with the least significant bit of the target memory address not contained within f1, wherein f2 is j bits in length, and wherein $2^j$ is equal to the width of a virtual memory space measured in memory blocks,
    wherein the least significant bit of f3 is aligned with least significant bit of the target memory address not contained in f1 and f2, and wherein f3 is m bits in length,
    wherein the least significant bit of f4 is aligned with the least significant bit of the target memory address not contained in f1, f2, and f3, wherein f4 is k bits in length, wherein k is equal to the number of bits in the target memory address minus the number of bits contained in f1, f2 and f3, wherein $2^k$ is equal to the height of the virtual memory space measured in memory blocks;
  examining f1, wherein if the content of f1 is greater than to n minus the tile width, then a horizontal boundary violation is indicated; and
  examining f3, wherein if the content of f3 is greater than to m minus the tile height, then a vertical boundary violation is indicated.

34. The method of claim 31, wherein the memory block width is equal to $2^n$ samples, wherein the memory block height is equal to $2^m$ samples, wherein the width of the array of pixels or samples is equal to two, and wherein the height of the array of pixels or samples is equal to two, wherein the determination whether the tile crosses a memory block boundary comprises:
  receiving a target memory address of the array, wherein the target memory address is within a linear address space of a memory, and wherein the target memory address corresponds to the storage location of the element residing in the first row of the first column of the array;
  decimating the target memory address into four binary fields, f1, f2 and f3, wherein each field comprises a unique subset of contiguous bits from the target memory address,
    wherein the least significant bit of f1 is aligned with the least significant bit position of the target memory address, and wherein f1 is n bits in length,
    wherein the least significant bit of f2 is aligned with the least significant bit of the target memory address not contained within f1, and wherein f2 is j bits in length, wherein $2^j$ is equal to the width of a virtual memory space measured in memory blocks,
    wherein the least significant bit of f3 is aligned with least significant bit of the target memory address not contained in f1 and f2, and wherein f3 is m bits in length,
    wherein the least significant bit of f4 is aligned with the least significant bit of the target memory address not contained in f1, f2 and f3, and wherein f4 is k bits in length, wherein k is equal to the number of bits in the target memory address minus the number of bits contained in f1, f2 and f3, wherein $2^k$ is equal to the height of the virtual memory space measured in memory blocks;

examining f1, wherein if all of the bits within f1 are equal to 1, then a horizontal boundary violation is indicated; and examining f3, wherein if all of the bits of f3 are equal to 1, then a vertical boundary violation is indicated.

35. A graphics system comprising:

a memory configured to receive and store a tile of graphics data;

a boundary violation detector connected to the memory, wherein the boundary violation detector is configured to receive an address corresponding to the tile and determine if the tile will cross a memory block boundary;

a write controller connected to the memory and the boundary violation detector, wherein the write controller is configured to split the tiles that cross the memory block boundaries; and a bus interface, wherein the bus interface is configured to couple the graphics system to a host system, wherein the bus interface is configured to receive the graphics data from the host system.

36. The graphics system of claim 35, wherein the memory is configured to perform a z-compare of the tile with a tile previously stored in the memory, wherein the compare operation is stored back to the memory.

37. The graphics system of claim 35, further comprising:

a display device, wherein the display device is configured to display images in accordance with the graphics data.

* * * * *